3,004,978
CERTAIN 1-TERT-AMINO LOWER ALKYL
AZABENZIMIDAZOLES
Alfred Hunger, Jindrich Kebrle, and Alberto Rossi, Basel, and Karl Hoffmann, Binningen, Switzerland, assignors to Ciba Pharmaceutical Products Inc., Summit, N.J.
No Drawing. Filed Mar. 15, 1960, Ser. No. 15,057
Claims priority, application Switzerland Mar. 18, 1959
7 Claims. (Cl. 260—294.8)

This invention provides 1-lower tertiary amino-lower alkyl-azabenzimidazoles, especially 1-lower tertiary-amino-lower alkyl-7-aza-benzimidazoles, and acid addition salts of these compounds. The compounds may be substituted in the 2-position, for example, by an alkyl, alkoxy, alkylmercapto, hydroxyl or mercapto group or halogen atom, especially lower alkyl, such as methyl, ethyl, propyl, butyl, lower alkoxy, such as methoxy, ethoxy, propoxy, butoxy, or lower alkyl-mercapto, such as methylmercapto, ethylmercapto, propylmercapto, butylmercapto, chlorine, bromine. Advantageously they are unsubstituted in the 2-position. The pyridine ring of the aza-benzimidazole may be substituted or unsubstituted. As substituents there may be mentioned those referred to above, and also advantageously the nitro group, especially in meta-position to the nitrogen atom. The invention provides more especially azabenzimidazoles of the formula

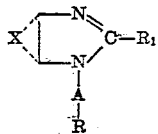

in which A represents a lower alkylene radical, having 1–5 carbon atoms, and R represents a lower tertiary amino group, for example an alkylene-imino group, which may be interrupted by a heteroatom, such as a piperidino, pyrrolidino, piperazino or morpholino group, but especially a di-lower alkylamino group, and in which $R_1$ represents a hydrogen or halogen atom or a hydroxy, mercapto, alkyl, alkoxy, alkylmercapto group, and

represents a pyridine ring which is substituted or unsubstituted in the manner referred to above, and acid addition salts of these compounds.

The new compounds possess the property of stimulating the central nervous system and in particular they possess an analeptic action and they assist respiration and exhibit antagonism to narcotics. They are therefore useful as medicaments, especially as analeptics. Of special interest owing to their therapeutic properties are compounds of the formula

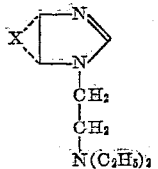

in which

represents a pyridine ring substituted by a nitro group, and especially 1-(β-diethylaminoethyl)-5-nitro-7-azabenzimidazole, and salts of these compounds.

The new azabenzimidazoles are obtainable by methods in themselves known. One process consists, for example, in forming the azabenzimidazole ring by ring closure starting from an amino pyridine, which contains in ortho-position to the amino group a lower tertiary amino lower alkylamino group or a substituent convertible into such group, for example, a hydroxyalkylamino group, or a corresponding N-substituted derivative thereof. The substituent convertible into a lower tertiary amino lower alkylamino group is then converted into such group, in the case of a hydroxy-alkyl amino group, for example, by chlorination followed by reaction with a lower secondary amine. Thus, for example, a 2-(lower tertiary amino-lower alkyl-amino)-3-amino-pyridine may be subjected directly or in stages to ring closure with an alkanic acid, for example, formic acid, acetic acid or propionic acid, or a reactive functional derivative of such acid, especially an ester thereof with an alcohol that splits off easily or imino-ether thereof, or with a carbonic or thio-carbonic acid derivative. The final products can also be made by using for the condensation, instead of alkanic acid, an alkane-aldehyde or a functional derivative thereof, and oxidising the product so obtained.

In the aforesaid reactions the starting materials may be formed under the reaction conditions. Thus, for example, it is of advantage to subject, for example, an acylamino-pyridine, which contains a halogen atom in ortho-position to the amino group, to ring closure with a lower tertiary amino lower alkylamine to form the corresponding azabenzimidazole derivative.

Another process for making the new compounds consists in introducing into the 1-position of an azabenzimidazole directly or in stages a lower tertiary amino lower alkyl group. Thus, an azabenzimidazole may be reacted with a reactive ester of an alcohol of the formula

HO—A—R' in which A has the meaning given above, and R' represents a lower tertiary amino group or a substituent convertible into such group, for example, a hydroxyl group, and, when the resulting compound contains a substituent convertible into a lower tertiary amino group, the said substituent is so converted, for example, a hydroxyl group by chlorination followed by reaction with a lower secondary amine. Reactive esters are more especially those of strong inorganic or organic acids, such as hydrohalic acids or inorganic sulfonic acids such as para-toluene sulfonic acid. The introduction is advantageously carried out in the presence of a condensing agent, especially one capable of forming a metal salt with the azabenzimidazole, such as an alkali metal or alkaline earth metal, for example, sodium, lithium or calcium, or an amide, hydride, hydrocarbon compound, alcoholate, oxide or hydroxide of such metal, for example, sodamide, sodium hydride, lithium butyl, potassium phenyl, lithium phenyl, potassium tertiary butylate, potassium tertiary amylate, sodium ethylate, sodium oxide or sodium hydroxide, or with the use of the preformed metal salt of the benzimidazole. When the reaction leads to a mixture of position isomers, the mixture is separated into its components, for example, by crystallization of the bases or salts thereof.

Substituents may be introduced into the imidazole or pyridine nucleus of the products, or existing substituents may be replaced by other substituents, for example, a hydroxyl group may be converted into an etherified or esterified hydroxyl group, such as a lower alkoxy group, or a nitro group may be converted into an amino group and the latter into a lower alkoxy group or a halogen atom.

The reactions are carried out in the presence or absence of a diluent and/or condensing agent, when necessary, at a raised temperature under atmospheric or superatmospheric pressure.

Depending on the procedure used the new compounds are obtained in the form of the free bases or salts thereof. From the salts the free bases can be obtained by methods in themselves known. From the free bases salts can be made by reaction with acids suitable for making therapeutically useful salts, for example, hydrohalic acid, sulfuric acid, nitric acid, phosphoric acid, thiocyanic acid, acetic acid, propionic acid, oxalic acid, malonic acid, succinic acid, maleic acid, methane sulfonic acid, ethane sulfonic acid, oxyethane sulfonic acid, benzene or toluene sulfonic acid or a therapeutically active acid.

The starting materials are known or can be made by methods in themselves known.

The invention also includes any modification of the process in which there is used as starting material a compound obtainable as an intermediate product at any stage of the process and the remaining steps of the process are carried out.

The new compounds can be used as medicaments, for example, in the form of pharmaceutical preparations which contain the compound or a salt thereof in admixture with a pharmaceutical organic or inorganic, solid or liquid carrier suitable for enteral, parenteral or topical administration. For making the carriers there are used substances that do not react with the new compound, for example, water, gelatine, lactose, starches, magnesium stearate, talc, vegetable oils, benzyl alcohols, gums, polyalkylene glycols, white petroleum jelly, cholesterol or other known carrier for medicants. The pharmaceutical preparations may be in the form, for example, of tablets, dragees, salves, creams or in liquid form as solutions, suspensions or emulsions. If desired they may be sterilized and/or may contain auxiliary substances, such as preserving, stabilizing, wetting or emulsifying agents, salts for regulating the osmotic pressure or buffers. They may also contain other therapeutically useful substances.

The following examples illustrate the invention:

*Example 1*

6 grams of 2-(β-diethylamino-ethylamino)-3-amino-5-nitropyridine, dissolved in 10 ml. of formic acid, are boiled under reflux for one hour, after which the excess of formic acid is removed in vacuo, the residue is dissolved in water, the base is liberated by means of ammonia, and is filtered off after cooling. The resulting 1-(β-diethylamino-ethyl)-5-nitro-7-azabenzimidazole of the formula

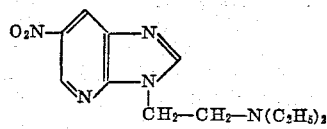

melts at 66–67° C. Its hydrochloride, which is obtained by treating a concentrated alcoholic solution of the base with the calculated quantity of alcoholic hydrochloric acid, melts at 206–208° C.

The 2 - (β - diethylamino - ethylamino) - 3 - amino-5-nitropyridine used as starting material can be prepared as follows:

A warm solution of 20.3 grams of 2-chloro-3:5-dinitropyridine in 150 ml. of toluene at 80° C. is added dropwise to a solution of 17 grams of diethylamino-ethylamine in 50 ml. of toluene, while stirring, and the whole is then boiled under reflux for 2 hours. 50 ml. of a 2 N-solution of caustic soda are stirred into the cooled reaction mixture, the toluene layer is separated in a separating funnel, the base is extracted with 2 N-hydrochloric acid, and then liberated from the aqueous solution by means of ammonia. The base is taken up in ether, the ethereal solution is dried with magnesium sulfate, the solvent is removed, and the residue is distilled under a high vacuum. 2-(β-diethylamino-ethylamino)-3:5-dinitro-pyridine of the formula

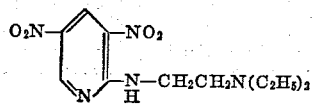

is a yellow crystalline substance which melts at 66° C. Its hydrochloride is also yellow and melts at 179–180° C.

5.5 grams of 2-(β-diethylamino-ethylamino)-3:5-dinitro-pyridine are dissolved in 50 ml. of alcohol at 70° C., 11 ml. of concentrated ammonia solution are added, and the solution is saturated with hydrogen sulfide gas at that temperature. The solution is then evaporated in vacuo, the residue is taken up in 10 ml. of 5 N-hydrochloric acid, the solution is treated with animal charcoal and then filtered, and the filtrate is rendered alkaline with ammonia. The base is taken up in ether, the ethereal solution is dried with magnesium sulfate, the solvent is removed, and the base is purified by way of its hydrochloride. The base is liberated from its hydrochloride in aqueous solution by means of ammonia and is crystallized from benzene.

The 2-(β-diethylamino-ethylamino)-3-amino-5-nitropyridine of the formula

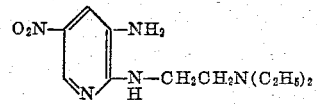

has a brown-red color and melts at 83° C. Its hydrochloride melts at 200–205° C.

*Example 2*

By the method described in Example 1 there is obtained from 2-(β-dimethylamino-ethylamino)-3-amino-5 - nitropyridine, 1 - (β - dimethylamino - ethyl) - 5 - nitro-7-azabenzimidazole of the formula

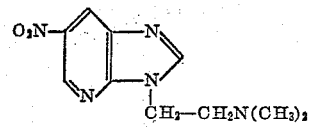

Its hydrochloride melts at 258° C.

The base used as starting material, namely 2-(β-dimethylamino-ethylamino)-3-amino-5-nitropyridine, is prepared as follows:

To 44.4 grams of 2-chloro-3:5-dinitropyridine, dissolved in 300 ml. of toluene, are added dropwise, while stirring, at 80° C. 38 grams of dimethylamino-ethylamine dissolved in 100 ml. of toluene. When the addition is complete the reaction mixture is boiled under reflux for 2 hours, then cooled to room temperature, and stirred with 100 ml. of a 2 N-solution of caustic soda. The toluene layer is removed, washed with water and thoroughly agitated with 300 ml. of 2 N-hydrochloric acid. The yellow crystalline hydrochloride is filtered off and washed with a small amount of benzene. The resulting 2 - (β - dimethyl - amino - ethylamino) - 3:5 - dinitropyridine hydrochloride melts at 268–270° C.

To 29.5 grams of the latter hydrochloride dissolved in 300 ml. of ethanol, which contains 60 ml. of a concentrated aqueous solution of ammonia, there are simultaneously added dropwise, while stirring, a solution of 33 grams of sodium hydrosulfide of 71% strength dissolved in 100 ml. of water and 32 grams of ammonium chloride also dissolved in 100 ml. of water in the course of 1 hour. The temperature rises to 40° C. during the dropwise addition. When the addition is complete the whole is stirred at room temperature for 3 hours, then adjusted to a pH value of 3–4 with hydrochloric acid (1:1), whereupon the hydrochloride crystallises out. The latter is dissolved in the minimum quantity of water, the solution is clarified with animal charcoal, and, after rendering the solution alkaline with ammonia, the red crystalline 2-(β-dimethylamino-ethylamino)-3-amino-5-nitropyridine melting at 137–138° C. is obtained.

*Example 3*

A mixture of 7.6 grams of 2-(β-diethylamino-ethylamino)-3-amino-5-nitro-pyridine and 9 grams of urea is heated at 170–180° C. until the splitting off of ammonia has substantially ceased (4–5 hours). The melt is dissolved in 200 ml. of alcohol, the solution is clarified with animal charcoal and rendered weakly acid with alcoholic hydrochloric acid, whereupon the hydrochloride of 1-(β - diethylamino - ethyl) - 2 - hydroxy-5-nitro-7-azabenzimidazole of the formula

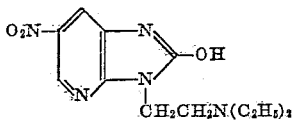

melting at 240° C. crystallises out.

Example 4

1 - (β - dimethylamino - ethyl) - 2 - hydroxy - 5 - nitro-7-azabenzimidazole of the formula

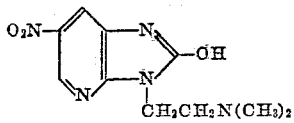

is obtained in a manner analogous to that described in Example 3 by heating 2-(β-dimethylamino-ethylamino)-3-amino-5-nitropyridine with urea. Its hydrochloride melts at 203–205° C.

Example 5

A solution of 8.4 grams of 3-amino-4-(β-diethylamino-ethylamino)-pyridine in 50 ml. of glacial acetic acid is boiled under reflux for 16 hours. The solution is then evaporated in vacuo, a 2 N-solution of caustic soda is added to the residue, and the alkaline aqueous solution is extracted with chloroform. The chloroform extracts are washed with water, dried over magnesium sulfate, filtered and evaporated.

The residue is distilled in a high vacuum, whereby 1-(β - diethylamino - ethyl) - 2 - methyl - 5 - azabenzimidazole of the formula

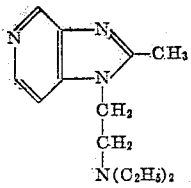

passes over as a colorless oil boiling at 170–172° C. under 0.04 Tor.

By adding to a solution of the base in a small amount of methanol the calculated quantity of hydrochloric acid in ethyl acetate there is obtained in the dihydrochloride which melts at 260–262° C. after recrystallization from a mixture of methanol and ether.

The 3 - amino - 4 - (β - diethylamino - ethylamino) - pyridine used as starting material is prepared as follows:

To a solution of 13.5 grams of diethylamino-ethyl-amine in 70 ml. of absolute toluene at room temperature is added dropwise, while stirring, a solution of 12.3 grams of 3-nitro-4-chloropyridine in 20 ml. of absolute toluene. When the mixture has been stirred for 2 hours at 80° C., the cooled reaction mixture is extracted with dilute hydrochloric acid, the acid solution is rendered alkaline with an aqueous solution of ammonia and extracted with chloroform.

The residue obtained by evaporating the chloroform is distilled in a high vacuum, whereby 3-nitro-4-(β-diethyl-amino-ethylamino)-pyridine is obtained as a red oil boiling at 141–143° C. under 0.05 Tor.

12.5 grams of the latter nitro-compound are dissolved in 70 ml. of alcohol and hydrogenated in the presence of a nickel or palladium catalyst until the theoretical quantity of hydrogen has been absorbed. The mixture is filtered to remove the catalyst, the solution is evaporated under reduced pressure, and the residue is distilled in a high vacuum, whereby 3-amino-4-(β-diethylamino-ethylamino)-pyridine is obtained as a viscous oil boiling at 155–160° C. under 0.07 mm. pressure of mercury. Its dihydrochloride melts at 244–247° with decomposition.

Example 6

Using the process described in Example 5 and formic acid of 98% strength instead of glacial acetic acid, there is obtained 1-(β-diethylamino-ethyl)-5-aza-benzimidazole of the formula

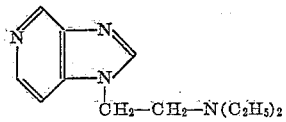

in the form of a colorless oil boiling at 130° C. under 0.03 mm. of pressure whose dihydrochloride melts at 225–226° C.

When propionic acid is used instead of glacial acetic acid, there is obtained 1-(β-diethylamino-ethyl)-2-ethyl-5-azabenzimidazole of the formula

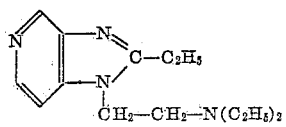

in the form of a colorless oil boiling at 145–150° C. under 0.02 mm. of pressure.

When isobutyric acid is used and the reaction mixture is boiled for at least 48 hours there is obtained 1-(β-diethylamino - ethyl) - 2 - isopropyl - 5 - azabenzimidazole of the formula

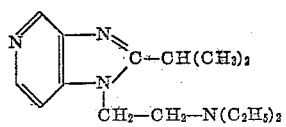

in the form of a colorless oil boiling at 150–155° under 0.02 mm. of pressure.

Example 7

9 grams of carbon disulfide are added to a solution of 12 grams of 3-amino-4-(β-diethylamino-ethylamino)-pyridine in 60 cc. of absolute methanol and the whole boiled gently under reflux for 16 hours. The reaction solution is evaporated on a water bath under reduced pressure, and the solid residue recrystallized from a mixture of ethanol and petroleum ether, 1-(β-diethylamino-ethyl)-2-mercapto-5-azabenzimidazole of the formula

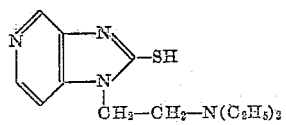

being obtained in the form of faintly yellow crystals melting at 175–176° C., whose hydrochloride melts at 248–250° C. with decomposition.

Example 8

A solution of 16.9 grams of 3-amino-4-(β-dimethyl-amino-ethylamino)-pyridine in 100 cc. of formic acid of 98% strength is heated for 16 hours under reflux. The reaction solution is then evaporated under reduced pressure, the residue is treated with concentrated ammonia and the alkaline aqueous solution extracted with chloroform. The chloroformic extracts are dried over magnesium sulfate, filtered off and evaporated. The residue is distilled in a high vacuum, 1-(β-dimethylamino-ethyl)-5-azabenzimidazole of the formula

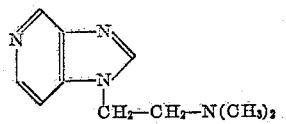

passing over as a colorless oil boiling at 135–140° C. under 0.05 mm. of pressure. The dihydrochloride melts at 240–242° C.

The 3 - amino - 4 - (β - dimethylamino-ethyl-amino)-pyridine used as starting material is prepared as follows:

A solution of 46 grams of 3-nitro-4-chloropyridine in 50 cc. of absolute toluene is added dropwise to a solution of 38.2 grams of dimethylamino-ethylamine in 200 cc. of absolute toluene at room temperature with stirring. The mixture is stirred for 2 hours at 80° C., the cooled reaction mixture extracted with dilute hydrochloric acid, the acidic solution rendered alkaline with aqueous ammonia solution and extracted with chloroform.

The solid yellow chloroform residue is recrystallized from a mixture of ethyl acetate and petroleum ether, 3-nitro-4-(β-dimethylamino-ethylamino)-pyridine being obtained in the form of yellow crystals melting at 97–98.5° C.

44 grams of this nitro compound are dissolved in 200 cc. of alcohol and hydrogenated in the presence of a nickel or palladium catalyst until the theoretical quantity of hydrogen has been taken up. The catalyst is filtered off, the solution evaporated under reduced pressure and the residue distilled in a high vacuum, 3-amino-4-(β-dimethylamino-ethylamino)-pyridine being obtained as a viscous oil boiling at 144–148° C. under 0.05 mm. of pressure.

If the base is boiled with glacial acetic acid instead of with formic acid as described above, there is obtained 1-(β- dimethylamino-ethyl) -2- methyl -5- azabenzimidazole of the formula

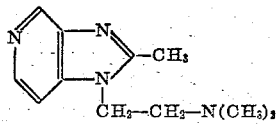

in the form of a faintly yellow oil boiling at 135–140° C. under 0.06 mm. of pressure, whose dihydrochloride melts at 288–289° C. with decomposition.

Example 9

A solution of 14.5 grams of 3-amino-4-(β-morpholino-ethylamino)-pyridine in 100 cc. of formic acid of 98% strength is boiled under reflux for 16 hours, evaporated under reduced pressure, the residue treated with concentrated ammonia solution and extracted with chloroform.

The solid chloroformic residue is recrystallized from a mixture of ethyl acetate and petroleum ether, 1-(β-morpholino-ethyl)-5-azabenzimidazole of the formula

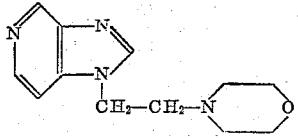

being obtained in the form of colorless crystals melting at 106–108° C., whose dihydro-chloride melts at 269–271° C. with decomposition.

The 3 - amino - 4 - (β - morpholino - ethylamino)-pyridine used as starting material can be prepared as follows:

By reacting 52.5 grams of morpholino-ethylamine with 43 grams of 3-nitro-4-chloro-pyridine by the process described for 3-nitro-4-(β-diethylamino-ethylamine)-pyridine in Example 5, there is obtained 3-nitro-4-(β-morpholino-ethylamino)-pyridine as a viscous brown oil boiling at 190–194° C. under 0.08 mm. of pressure.

By hydrogenation of the nitro compound in alcoholic solution with a nickel or palladium catalyst until the theoretical quantity of hydrogen has been taken up, 3-amino-4-(β-morpholino-ethylamino)-pyridine is obtained as a faintly brown oil boiling at 190–195° C. under 0.08 mm. of pressure.

If the base is boiled with glacial acetic acid instead of formic acid, 1-(β-morpholino-ethyl)-2-methyl-5-azabenzimidazole of the formula

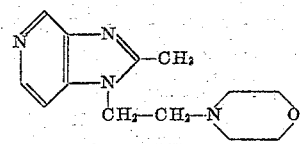

is obtained as a faintly yellow oil boiling at 185–190° C. under 0.07 mm. of pressure whose dihydrochloride melts at 281–282° C. with decomposition.

Example 10

1 - (β -diethylamino - ethyl) - 2 - ethyl - 5 - nitro-7-azabenzidimidazole of the formula

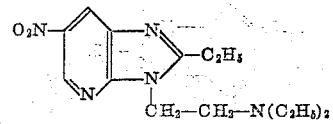

prepared from 2-(β-diethylamino-ethylamino)-3-amino-5-nitropyridine and propionic acid at 110–120° C. by the process described in Example 1, melts at 65–66° C.; its hydro-chloride melts at 215–216° C.

1 - (β - diethylamino - ethyl) - 2 - propyl - 5 - nitro-7-azabenzimidazole of the formula

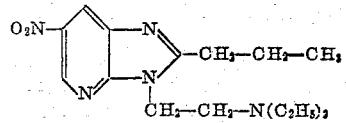

prepared in the same manner from butyric acid, melts at 72–73° C.; its hydrochloride melts at 184–185° C.

Example 11

10 grams of 2-(β-diethylamino-ethylamino)-3-amino-5-nitro-pyridine are boiled in 100 cc. of methyl alcohol with 10 grams of carbon disulfide for 16 hours, evaporated in vacuo and the precipitated 1-(β-diethylamino-ethyl)-2-mercapto-5-nitro-7-azabenzimidazole of the formula

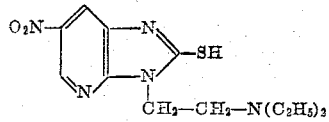

melting at 191–192° C. filtered off. The hydrochloride prepared in the customary manner melts at 240–241° C.

Example 12

14.75 grams of 1-(β-diethylamino-ethyl)-2-mercapto-5-nitro-benzimidazole are added to a sodium methylate solution prepared from 1.25 grams of sodium and 200 cc. of mehanol, and 3.5 cc. of methyl iodide are then added dropwise. After being allowed to stand overnight under reduced pressure, the reaction mixture is taken up in water and ether, the ethereal solution washed with sodium carbonate solution and water, dried over magnesium sulfate and evaporated. The remaining 1-(β-diethylamino - ethyl) - 2 - methylmercapto - 5 - nitro-7-azabenzimidazole of the formula

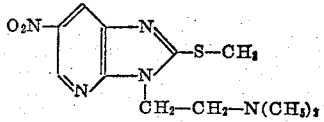

melts at 86–87° C. after crystallization from alcohol; its hydrochloride melts at 206–207° C.

Example 13

11 grams of propionic acid nitrile are saturated in 100 cc. of chloroform and 11.5 cc. of absolute alcohol at 0° C. with hydrogen chloride, allowed to stand overnight and evaporated under reduced pressure at a temperature of 30° C. at the most. The remaining imino ether hydrochloride is stirred with 6.8 grams of 2-(dimethylamino-ethylamino)-3-amino-5-nitro-pyridine in 80 cc. of propionic acid at 50° C., the reaction mixture evaporated under reduced pressure, the residue taken up in aqueous hydrochloric acid and extracted with ether. The acidic aqueous solution is then rendered alkaline with aqueous ammonia, extracted with chloroform, the chloroformic extract agitated with sodium carbonate solution and dried over magnesium sulfate and evaporated. The remaining 1 - (β - dimethylamino - ethyl) - 2 - ethyl - 5 - nitro - 7-azabenzimidazole of the formula

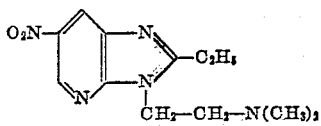

melts at 98–100° C. after crystallization from ether; its hydrochloride melts at 237–238° C.

Example 14

2 - (β - diethylamino - ethylamino) - 3 - amino-pyridine, obtained by hydrogenating 24.9 grams of 2-(β-diethylamino-ethylamino)-3-nitro-pyridine in 200 cc. of ethanol in the presence of 5 grams of Raney nickel and evaporation, is boiled for 3 hours in 70 cc. of formic acid. The reaction mixture is evaporated under reduced pressure, the residue taken up in water, rendered alkaline with ammonia solution and extracted with ethyl acetate. The extract is dried with magnesium sulfate and evaporated and the remaining 1-(β-diethylamino-ethyl)-7-azabenzimidazole of the formula

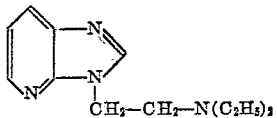

distills in a bulb tube at 125° C. under 0.07 mm. of pressure.

The 2 - (β - diethylamino - ethylamino) - 3 - nitro-pyridine used as starting material is obtained as follows:

23 grams of 2-chloro-3-nitro-pyridine are dissolved in 150 cc. of toluene with heating and added dropwise at 80° C. to 26 cc. of β-diethylamino-ethylamine in 50 cc. of toluene. The whole is then boiled for two hours, cooled, sodium hydroxide solution is added until the mixture shows an alkaline reaction, and the toluene solution extracted with hydrochloric acid. The acidic aqueous solution is rendered alkaline with aqueous ammonia, extracted with ether and the extract washed with sodium chloride, dried over magnesium sulfate and evaporated. The remaining 2-(β-diethylamino-ethylamino)-3-nitro-pyridine distills in a bulb tube at 120° C. under 0.05 mm. of pressure.

Example 15

2 - (β - dimethylamino - ethylamino) - 3 - amino - pyridine, obtained by hydrogenating 21.1 grams of 2-(β-dimethylamino-ethylamino)-3-nitro-pyridine in 200 cc. of ethanol in the presence of 5 grams of Raney nickel and by evaporation, is boiled for 2 hours in 70 cc. of formic acid. The reaction mixture is evaporated under reduced pressure, the residue taken up in water, rendered alkaline with ammonia solution, extracted with ethyl acetate, dried and evaporated. The remaining 1-(β-dimethylamino-ethyl)-7-azabenzimidazole of the formula

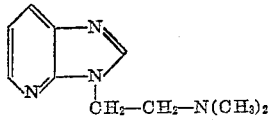

distills in a bulb tube at 115° C. under 0.05 mm. of pressure.

The 2-(β-dimethylamino-ethylamino)-3-nitro-pyridine used as starting material can be prepared in a manner analogous to that described in Example 14 for 2-(β-diethylamino-ethylamino)-3-nitro-pyridine and melts at 58–59° C. after crystallization from ether.

Example 16

9 grams of 3-amino-4-(β-dimethylamino-ethylamino)-5-nitro-pyridine are boiled under reflux for 3 hours in 30 cc. of formic acid. The mixture is then evaporated under reduced pressure, the residue taken up in water, rendered alkaline with ammonia and extracted with ether. The ethereal extract is dried over magnesium sulfate and evaporated to yield 1-(β-dimethylamino-ethyl)-7-nitro-5-azabenzimidazole of the formula

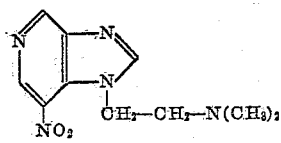

from a mixture of ether and hexane. Melting point: 76–78° C.; its hydrochloride melts at 252° C.

The 3-amino-4-(β-dimethylamino-ethylamino)-5-nitropyridine used as starting material can be prepared as follows:

20 grams of 4-chloro-3:5-dinitro-pyridine dissolved in 120 cc. of toluene are added dropwise to 19.5 grams of dimethylamino-ethylamine and 300 cc. of toluene at 80° C., and stirred for one hour at 80° C. The reaction mixture is then cooled, aqueous ammonia is added until the mixture gives an alkaline reaction, and the toluene solution extracted with hydrochloric acid. The acidic aqueous solution is then again rendered alkaline with ammonia and precipitating crystalline 4-(β-dimethylamino-ethylamino)-3:5-dinitro-pyridine filtered off.

16 grams of 4-(β-dimethylamino-ethylamino)-3:5-dinitro-pyridine are converted into the hydrochloride, dissolved in 190 cc. of alcohol and 37.2 cc. of concentrated ammonia, and 20.8 grams of sodium hydrogen sulfide of 73% strength in 60 cc. of water and 21 grams of ammonium chloride in 60 cc. of water are added dropwise simultaneously. The whole is then stirred for three hours, hydrochloric acid is added until the mixture gives an acid reaction, the precipitated sulfur is filtered off and the filtrate concentrated to 100 cc. The filtrate is rendered alkaline with concentrated ammonia and extracted with benzene. The benzene extract is dried with magnesium sulfate and evaporated to yield 3-amino-4-(β-dimethylamino-ethylamino)-5-nitro-pyridine from a mixture of benzene and hexane. The product melts at 98–100° C.

Example 17

0.95 g. of 5(6)-nitro-7(4)-azabenz-imidazole are suspended in 50 ml. of ethanol and mixed with a solution of 0.15 g. of sodium in 30 ml. of ethanol, the nitro compound, as orange-colored salt, passing into solution. In the course of 10 minutes there is added dropwise, while stirring, a solution of 0.8 g. of β-diethylamino-ethylchloride in 20 ml. of ethanol, the color of the reaction solution turning from orange to yellow. When the addition is complete, the mixture is stirred for 1 hour at 60° C. and then evaporated under reduced pressure. The residue is agitated with a mixture of 10 ml. of 2 N-sodium hydroxide solution and 100 ml. of ether, the ethereal extract is washed twice with saturated sodium chloride solution, dried over magnesium sulfate, and evaporated. The residual oil is mixed with one equivalent of alcoholic hydrochloric acid and the hydrochloride crystallized by the careful addition of ether. The hydrochloride so obtained melts unsharply at 170–180° C. and consists of two isomers which can be separated to a large extent by fractional crystallization from alcohol. From the hydrochlorides thus purified there can be isolated by liberating the bases and recrystallizing the latter from a mixture of ether and pentane, the 1-(β-diethylamino-ethyl)-5-nitro-7-azabenzimidazole of melting point 66–67° C. (melting point of the hydrochloride 206–208° C.), of the formula

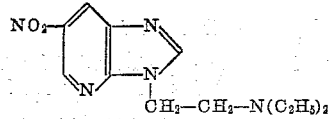

and the isomeric 1-(β-diethylamino-ethyl)-6-nitro-4-azabenzimidazole of the formula

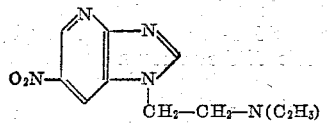

melting at 98–99° C. In the UV absorption spectrum, the two isomers have two distinct bands at 235 and 305 mμ. However, they clearly differ in the ratio of extinction of the two bands. While with the first-mentioned compound ε305/ε235=0.43, this factor, in the case of the isomeric 6-nitro-7-aza compound is ε305/ε235=0.66.

The 5(6)-nitro-7(4)-azabenz-imidazole of the formulae

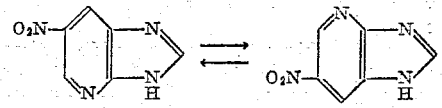

can be prepared by the following series of reactions:

11 g. of 2-chloro-3,5-dinitropyridine are dissolved in 80 ml. of alcohol and admixed dropwise, while stirring, with a mixture of 30 ml. of concentrated ammonia solution and 80 ml. of alcohol. During the addition, the solution turns orange-yellow, and an orange-yellow product crystallizes soon. When the addition is complete, stirring is continued for 15 minutes, the reaction mass then cooled to 0° C., and filtered. The resulting 2-amino-3,5-dinitropyridine melts at 190–192° C.

8.8 g. of this compound are mixed with a mixture of 94 ml. of alcohol and 27 ml. of concentrated ammonia solution, and to the suspension are simultaneously added dropwise, while stirring, in the course of 15 minutes a solution of 16.2 g. of sodium hydrosulfide in 47 ml. of water and a solution of 16 g. of ammonium chloride in 47 ml. of water. The reaction mixture assumes a deep red coloration, and a dark red product soon crystallizes out. After three hours, the product is filtered off with suction and washed with a 1:1-mixture of alcohol and ether. The 2,3-diamino-5-nitropyridine so obtained melts at 260° C.

5 g. of this nitrodiamine are heated under reflux for 20 minutes with 10 ml. of formic acid, the mixture then evaporated under reduced pressure, and the residue triturated with water, given a pH of 6 with ammonia, and filtered with suction. This crude product is boiled with 200 ml. of alcohol in the presence of a small quantity of Norit, the solution filtered, and the orange-yellow filtrate concentrated to 80 ml. to obtain a crystalline orange-yellow product, namely 5(6)-nitro-7(4)-azabenz-imidazole which gradually sinters and decomposes when heated above 260° C.

What is claimed is:

1. A member selected from the group consisting of a 1-lower tertiary amino lower alkyl-azabenz-imidazole of the formula

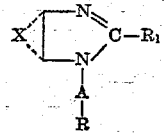

and non-toxic acid addition salts thereof in which A stands for lower alkylene, and R for a tertiary amino substituent selected from the group consisting of di-lower alkylamino, pyrrolidino, piperidino, morpholino and piperazino, and in which $R_1$ stands for a member selected from the group consisting of hydrogen, hydroxy, mercapto, lower alkyl, lower alkoxy, lower alkylmercapto and halogen and X stands for the bonds necessary to complete a 6-membered pyridine ring selected from the group consisting of the unsubstituted pyridine ring and the monosubstituted pyridine ring the substituents on said pyridine ring being selected from the group consisting of hydroxy, mercapto, lower alkyl, lower alkoxy, lower alkylmercapto, halogen and nitro.

2. An azabenzimidazole of the formula

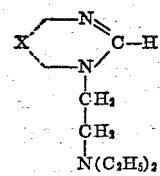

in which X stands for the bonds necessary to complete the 6-membered pyridine ring substituted by a nitro group.

3. 1-(β-diethylamino-ethyl)-5-nitro-7-azabenzimidazole.

4. 1-(β-dimethylamino-ethyl)-5-nitro - 7 - azabenzimidazole.

5. Non-toxic acid addition salts of the compounds claimed in claim 2.

6. Non-toxic acid addition salts of the compounds claimed in claim 3.

7. Non-toxic acid addition salts of the compounds claimed in claim 4.

No references cited.